US010820739B2

(12) United States Patent
Eisenberg

(10) Patent No.: US 10,820,739 B2
(45) Date of Patent: Nov. 3, 2020

(54) FRENCH COFFEE PRESS

(71) Applicant: Toby Matthew Eisenberg, Dallas, TX (US)

(72) Inventor: Toby Matthew Eisenberg, Dallas, TX (US)

( * ) Notice: Subject to any disclaimer, the term of this patent is extended or adjusted under 35 U.S.C. 154(b) by 314 days.

(21) Appl. No.: 15/790,964

(22) Filed: Oct. 23, 2017

(65) Prior Publication Data

US 2018/0110357 A1    Apr. 26, 2018

Related U.S. Application Data

(60) Provisional application No. 62/412,130, filed on Oct. 24, 2016.

(51) Int. Cl.
*A47J 31/20* (2006.01)
*A47J 31/44* (2006.01)
*A47J 31/38* (2006.01)

(52) U.S. Cl.
CPC ............ *A47J 31/20* (2013.01); *A47J 31/38* (2013.01); *A47J 31/44* (2013.01)

(58) Field of Classification Search
CPC ............. A47J 31/20; A47J 31/38; A47J 31/44
USPC ............... 99/297, 302 P, 287, 495, 298, 317; 100/37, 295; 220/625; 110/116, 120, 110/125; 210/474
See application file for complete search history.

(56) References Cited

U.S. PATENT DOCUMENTS

| | | | | |
|---|---|---|---|---|
| 482,299 A * | 9/1892 | Comstock | | A47J 31/20 99/317 |
| 512,675 A * | 1/1894 | Appleberg | | A47J 31/02 99/299 |
| 882,183 A * | 3/1908 | Wells | | A47J 31/20 99/319 |
| 2,078,561 A * | 4/1937 | Cavalletti | | A47J 31/0576 99/302 R |
| 2,086,463 A * | 7/1937 | Bram | | A47B 3/0912 108/65 |
| 2,109,363 A * | 2/1938 | Williams | | A47J 31/20 99/284 |
| 2,562,433 A * | 7/1951 | Moore | | A47J 31/20 99/319 |
| 2,900,896 A * | 8/1959 | Bondanini | | A47J 31/20 99/287 |
| 3,020,823 A * | 2/1962 | Musso | | A47J 31/20 99/287 |
| 3,098,425 A * | 7/1963 | Falla | | A47J 31/053 99/317 |
| 3,113,533 A * | 12/1963 | Snow | | A47B 5/04 108/134 |

(Continued)

*Primary Examiner* — Jimmy Chou
(74) *Attorney, Agent, or Firm* — David W. Carstens; J. Andrew Reed; Carstens & Cahoon, LLP

(57) ABSTRACT

An improved French coffee press apparatus, system, and method that utilizes a locking ring to engage with a locking base that can be removed from the carafe, along with any coffee grounds. The locking ring is connected to the pressing rod, which also includes a filter system above the locking ring. The pressing rod fits through an opening in the carafe lid, and the carafe lid secures the liquid inside the carafe. The combination of the filtering system assists in the filtering and capture of any coffee grounds into the locking base for cleaning, and the locking ring assists in the removal of the locking base.

14 Claims, 10 Drawing Sheets

(56) References Cited

U.S. PATENT DOCUMENTS

| | | | | |
|---|---|---|---|---|
| 3,158,084 A * | 11/1964 | Cohn | A47J 31/20 | 99/297 |
| 3,279,351 A * | 10/1966 | Cohn | A47J 31/20 | 99/282 |
| 3,307,474 A * | 3/1967 | Kasher | A47J 31/60 | 99/287 |
| 3,413,908 A * | 12/1968 | Nadelson | A47J 31/20 | 99/297 |
| 3,657,993 A * | 4/1972 | Close | A47J 31/20 | 99/297 |
| 3,927,608 A * | 12/1975 | Doyel | A47J 31/20 | 99/297 |
| 3,935,318 A * | 1/1976 | Mihailide | A47J 31/20 | 426/80 |
| 4,365,544 A * | 12/1982 | Howitt | A47J 31/20 | 99/297 |
| 4,737,036 A * | 4/1988 | Offermann | A23G 3/0221 | 366/130 |
| 4,856,843 A * | 8/1989 | Elliott | B60P 3/42 | 296/186.4 |
| 4,927,107 A * | 5/1990 | Mateo Maria | A47B 5/04 | 108/134 |
| 4,962,615 A * | 10/1990 | Birdling | B60J 7/1642 | 49/381 |
| 4,998,484 A * | 3/1991 | Groetzinger | A47B 5/04 | 108/115 |
| 5,478,586 A * | 12/1995 | Connor | A47J 31/20 | 426/431 |
| 5,544,592 A * | 8/1996 | Leezer | A47B 5/06 | 108/123 |
| 5,570,623 A * | 11/1996 | Lin | A47J 31/20 | 99/285 |
| 5,588,697 A * | 12/1996 | Yoshida | A47B 13/16 | 108/160 |
| 5,618,570 A * | 4/1997 | Banks | A47J 31/20 | 426/435 |
| 5,713,404 A * | 2/1998 | Ladewig | B25H 1/04 | 108/42 |
| 5,770,074 A * | 6/1998 | Pugh | A47J 31/20 | 210/474 |
| 5,809,867 A * | 9/1998 | Turner | A47G 19/20 | 150/901 |
| 5,887,510 A * | 3/1999 | Porter | A47J 31/20 | 99/287 |
| 5,911,810 A * | 6/1999 | Kawabata | A47J 31/3652 | 99/289 P |
| 5,932,098 A * | 8/1999 | Ross | A47J 31/605 | 210/323.1 |
| 5,939,122 A * | 8/1999 | Brady | A23C 9/1524 | 426/474 |
| 5,943,946 A * | 8/1999 | Chen | A47J 31/20 | 99/297 |
| 5,952,028 A * | 9/1999 | Lesser | A23F 5/26 | 206/0.5 |
| 5,979,299 A * | 11/1999 | Hornsby | A47J 31/20 | 426/433 |
| 6,039,416 A * | 3/2000 | Lambert | A47B 5/06 | 108/48 |
| 6,079,316 A * | 6/2000 | Barden | A47J 31/20 | 150/901 |
| 6,161,486 A * | 12/2000 | Boots | A47B 5/06 | 108/33 |
| 6,231,909 B1 * | 5/2001 | Levinson | A23F 3/18 | 426/234 |
| 6,324,966 B1 * | 12/2001 | Joergensen | A47J 31/20 | 99/297 |
| 6,334,400 B1 * | 1/2002 | Nien | A47B 3/087 | 108/115 |
| 6,343,834 B1 * | 2/2002 | Wurmlinger | A47C 9/06 | 108/134 |
| 6,374,726 B1 * | 4/2002 | Melton | A47G 19/16 | 220/712 |
| 6,705,235 B1 * | 3/2004 | Gerutto | A47B 5/00 | 108/152 |
| 6,725,763 B2 * | 4/2004 | Cai | A47J 27/2105 | 99/287 |
| 6,797,160 B2 * | 9/2004 | Huang | A47J 31/20 | 210/117 |
| 6,797,304 B2 * | 9/2004 | McGonagle | A47J 31/20 | 426/431 |
| 7,093,531 B2 * | 8/2006 | Tardif | A47J 31/20 | 99/287 |
| 7,194,751 B2 * | 3/2007 | Fujii | G11B 7/24024 | 369/281 |
| 7,194,951 B1 * | 3/2007 | Porter | A47J 31/005 | 100/116 |
| 7,213,507 B2 * | 5/2007 | Glucksman | A47J 31/20 | 99/287 |
| 7,337,705 B1 * | 3/2008 | Catena | A47J 31/20 | 239/33 |
| 7,389,720 B2 * | 6/2008 | Haverstock | A47J 31/20 | 99/287 |
| 7,461,587 B2 * | 12/2008 | Guerrero | A47J 31/02 | 210/474 |
| 7,475,644 B2 * | 1/2009 | Strong | A47B 3/083 | 108/129 |
| 7,578,231 B2 * | 8/2009 | Liu | A47J 31/20 | 99/287 |
| 7,634,969 B2 * | 12/2009 | Neunzert | A47B 3/00 | 108/132 |
| 7,745,759 B2 * | 6/2010 | Long | A47J 31/20 | 219/214 |
| 7,849,784 B2 * | 12/2010 | Adler | A47J 31/32 | 99/287 |
| 8,051,766 B1 * | 11/2011 | Yu | A47J 31/20 | 220/625 |
| 8,156,875 B2 * | 4/2012 | Neunzert | A47B 3/083 | 108/129 |
| 8,267,017 B1 * | 9/2012 | Michael | A47B 5/04 | 108/134 |
| 8,313,644 B2 * | 11/2012 | Harris | C02F 1/002 | 210/198.1 |
| 8,375,846 B2 * | 2/2013 | Baccetti | A47J 31/20 | 99/297 |
| 8,402,888 B2 * | 3/2013 | Baccetti | A47J 31/20 | 100/116 |
| 8,887,623 B2 * | 11/2014 | Giordano | A47J 31/20 | 99/295 |
| 9,392,900 B2 * | 7/2016 | McLean | B01D 11/0253 | |
| 9,492,027 B2 * | 11/2016 | Morse | A47J 31/20 | |
| 9,526,369 B2 * | 12/2016 | Velasquez | A47J 31/38 | |
| 10,251,508 B2 * | 4/2019 | Pan | A47J 31/20 | |
| 10,264,911 B2 * | 4/2019 | McLean | A47J 31/20 | |
| 10,369,258 B2 * | 8/2019 | Hensler | A61M 1/0056 | |
| 2004/0094076 A1 * | 5/2004 | Jin | A47B 3/087 | 108/132 |
| 2005/0005826 A1 * | 1/2005 | Strong | A47B 3/087 | 108/132 |
| 2005/0120803 A1 * | 6/2005 | Sokol | G01N 29/2412 | 73/801 |
| 2005/0139091 A1 * | 6/2005 | Haverstock | A47J 31/20 | 99/495 |
| 2005/0241551 A1 * | 11/2005 | Neunzert | A47B 3/00 | 108/132 |
| 2006/0021524 A1 * | 2/2006 | Liu | A47J 31/20 | 100/116 |
| 2006/0124628 A1 * | 6/2006 | Long | A47J 31/20 | 219/438 |
| 2007/0028779 A1 * | 2/2007 | Pigliacampo | A47J 31/20 | 99/297 |
| 2007/0151461 A1 * | 7/2007 | Edmark | A47J 31/20 | 99/279 |
| 2007/0235433 A1 * | 10/2007 | Osicki | B23K 9/173 | 219/125.1 |
| 2007/0240580 A1 * | 10/2007 | Lusareta | B65D 47/06 | 99/279 |
| 2008/0245237 A1 * | 10/2008 | Haverstock | A47J 31/20 | 99/297 |

(56) References Cited

U.S. PATENT DOCUMENTS

| | | | | |
|---|---|---|---|---|
| 2009/0020018 A1* | 1/2009 | Melzer | A47J 31/0626 | 99/288 |
| 2009/0044460 A1* | 2/2009 | Medley | E04B 1/3444 | 52/71 |
| 2010/0005979 A1* | 1/2010 | Baccetti | A47J 31/20 | 100/37 |
| 2010/0319549 A1* | 12/2010 | Kelty | A47J 31/20 | 99/297 |
| 2011/0056385 A1* | 3/2011 | McLean | B01D 11/0253 | 99/297 |
| 2011/0088561 A1* | 4/2011 | Bodum | A47J 31/20 | 99/297 |
| 2011/0239549 A1* | 10/2011 | Medley | E04B 1/3444 | 52/79.5 |
| 2013/0233177 A1* | 9/2013 | Lambert | A47J 31/407 | 99/295 |
| 2015/0196158 A1* | 7/2015 | Velasquez | A47J 31/38 | 99/297 |
| 2015/0272378 A1* | 10/2015 | Sands | A47J 31/20 | 426/433 |
| 2016/0058235 A1* | 3/2016 | Blair | A47J 31/20 | 99/297 |
| 2016/0166103 A1* | 6/2016 | Morse | A47J 31/20 | 99/297 |
| 2017/0325617 A1* | 11/2017 | Dujmich | A47J 31/20 | |
| 2017/0360240 A1* | 12/2017 | Morse | A47J 31/20 | |
| 2018/0213967 A1* | 8/2018 | Liu | A47J 31/20 | |
| 2018/0289200 A1* | 10/2018 | Bodum | A47J 31/20 | |
| 2018/0303269 A1* | 10/2018 | Yakos | A47J 31/005 | |
| 2019/0082880 A1* | 3/2019 | Kaufman | A47J 31/20 | |
| 2019/0254463 A1* | 8/2019 | McLean | A47J 31/20 | |
| 2019/0365136 A1* | 12/2019 | Farkas | A47J 31/20 | |
| 2019/0387916 A1* | 12/2019 | Tempelis | A47J 31/20 | |

\* cited by examiner

FRENCH COFFEE PRESS

FIELD OF THE DISCLOSURE

The present invention generally relates to the field of a coffee or brewed drink maker. Specifically in its preferred embodiments, the present invention discloses a French coffee press with a removable base.

BACKGROUND

The topic of coffee making is often thought of at the start of the day as a person gets ready with a cup of their favorite blend. There is also a variety of manners in which to make a cup of coffee. The one most quickly thought of by many people would be a trip to Starbucks® or a from a single cup coffee maker like a Keurig™. However, for those who like the experience or the science of coffee making they will often use alternative methods, such as drip brewing or steeping. One method of steeping includes the French press. In a French press, a piston with an attached filter is pushed through the steeping liquid to push the coffee grounds or other brewing material to the bottom of the cylinder in which it was brewed.

One of the major deficiencies of French coffee presses today is the difficulty in cleaning. The traditional French coffee press is a tall, skinny cylinder in which the coffee grounds are pressed down and compacted into the bottom the cylinder. While brushes and water jets can assist in the cleaning process it is still difficult to remove the coffee grounds, in particular if a person is trying to avoid putting them down a sink, disposal, or dishwasher. Because of the difficulties in cleaning, one of the objectives of the present invention is to provide an improved French coffee press that is easily cleaned.

BRIEF SUMMARY

The present invention as embodied in an apparatus and method permits a user to brew coffee utilizing a French press, and steeping without the difficulties in cleaning that are commonplace with traditional French coffee presses. Thus, the present invention comprises a carafe, a lid for the carafe, a pressing rod, a filter system, and includes a locking base and a locking ring that is attached to the pressing rod. The locking ring and locking base provide the user with the ability to remove the coffee grounds from the carafe, without major difficulty.

The locking ring and locking base are secured together in a manner that allows the locking base to be removed from the carafe base. Once it is removed, then the locking base and locking ring can easily be separated from each other.

DETAILED DESCRIPTION

Figures 1A, 1B:
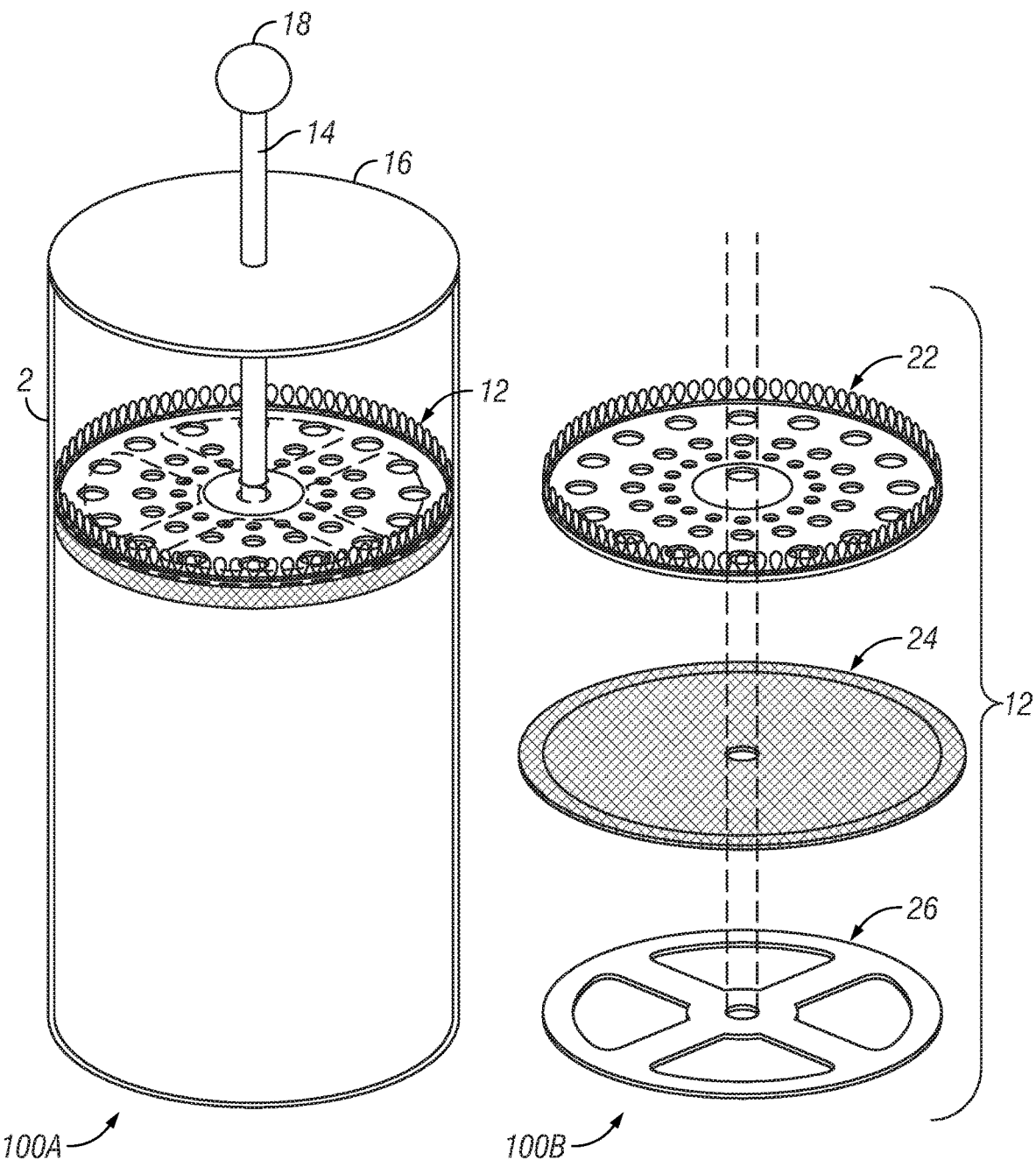
FIG. 1A provides a perspective view of a Prior Art French press coffee maker.
FIG. 1B provides a perspective view of a Prior Art French press filter system.

In FIG. 1A a traditional French press coffee maker 100A is presented. For a coffee drinker who is a purest a French press is one of the best ways to brew coffee. The carafe 2 is filled with your most delicious blend of ground coffee beans, the hot water, and the grounds are now ready to be filtered away by the filter system 12 after the desired brewing time has been completed. The filter system 12 is connected to the pressing rod 14 through known methods of connection such as one-piece manufacturing, press fit, or threaded connector. In some designs, there is also the pressing rod bulb 18 that can be connected to the pressing rod 14 by similar methods as the filter system 12. The carafe 2 and the carafe lid 16 help to prevent heat from escaping or the freshly brewed coffee from spilling from the inevitable bump. In addition, the carafe lid 16 provides stability to the press rod 14 during operation of the French press coffee maker.

The components 100B of the French press filter system 12 are seen in FIG. 1B. The French press filter system 12 is comprised of the upper retainer ring 22 that typically has a spring or other mechanism around the outer edge of the upper retainer ring 22 to assist in pressing the mesh filter 24 to the inner wall of the carafe 2. This pressing of the mesh filter 24 to the inner wall allows there to be some amount of pressure on the mesh filter 24, and the inner wall of the carafe 2, in order to prevent the coffee grounds or other brewing material from slipping around the mesh filter and returning to the filtered liquid. In addition, both the upper retainer ring 22 and the lower retainer ring 26 are an open design (holes or spokes) and not completely solid in order to allow the coffee or other liquid to flow through the mesh filter 24. Neither the upper retaining ring 22 nor the lower retaining ring 26 perform any filtering. The mesh filter 24 is placed between the upper retaining ring 22 and the lower retaining ring 26 to provide it support as it is pushed through the brewing coffee in order to filter the coffee grounds from the liquid brewed coffee.

Figures 2A, 2B:
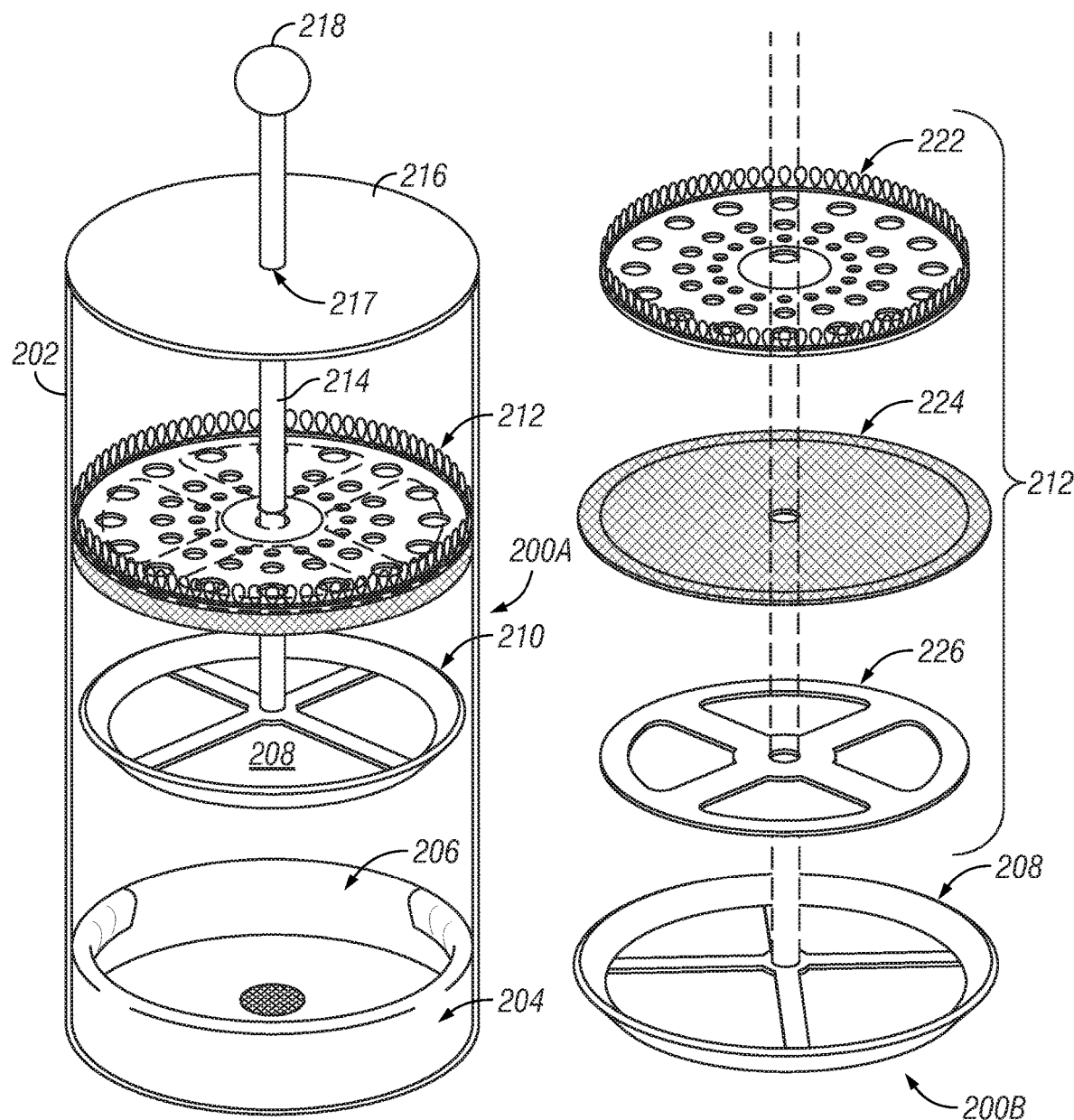
FIG. 2A illustrates a perspective view of an improved French press coffee maker.
FIG. 2B illustrates a perspective view of an improved French press filter system.

In FIG. 2A, the improved French coffee press 200A can be seen in a perspective view and in a partially pressed state. Starting from the outside, the carafe 202 can be made of any material capable of handling hot or cold liquids, such as glass, or stainless steel. Inside and fit to the bottom of the carafe 202 is a locking base 204 designed to capture brewing materials (not shown) at the end of the brewing process and assist in removing them from the carafe 202. The locking base 204 is made of a heat tolerant material that allows the locking base 204 to be semi-rigid. The locking base 204 is rigid except for the locking base lip(s) 206. The locking base lip(s) 206 are flexible enough to allow a locking ring lip(s) 210 to pass by and secure a locking ring 208 within the locking base 204 and the locking base lip(s) 206 for removal of the locking base 204 from the carafe 202.

The locking ring lip(s) 210 is the outer edge of the locking ring 208, which is made of a material that provides rigid strength and allows the locking ring lip(s) 210 to be flexible. In addition to the locking ring 208, there is also a filter system 212 in a preferred embodiment. While typically constructed of metal, the filter system 212 can also be constructed of plastics, glass, or other materials. The locking ring 208 and the filter system 212 in a preferred embodiment will be in close relation with each other, allowing the filter system 212 to filter brewing materials (not shown) and assist in pushing them into the locking base 204 at the end of the brewing process. When the locking ring 208 and locking ring lip(s) 210 engage with the locking base 204 and locking base lip(s) 206, a secure latching occurs allowing a user to remove the locking base 204 and captured brewing materials (not shown) from the carafe 202 easily. The locking ring 208 and the locking ring lip(s) 210 can be made of the same or a similar material as the locking base 204 and the locking base lip(s) 206. The bottom or a portion of the sides of the locking base 204 can be made of a solid or fine mesh material that would allow liquid to pass but will not allow any brewing material to leave the locking base 204. The mesh or solid material could make up a portion or the entire bottom or wall of the locking base 204. The material of the locking ring 208 and the locking base 204 also allow the locking ring 208 to be removably attached to the locking base 204.

The filter system 212 and the locking ring 208 are attached to a pressing rod 214 via a threaded connection or a press fit connection. In one embodiment, the filter system 212 would be attached to a threaded portion of the pressing rod 214, and adjacent to that threaded portion would be a second threaded portion of smaller diameter for the locking ring 208 to attach to. However, in alternative embodiments the locking ring 208 could be made of one piece manufacture with the filtering system 212, or be connected to the pressing rod 214 through other methods of connection.

In FIG. 2B the improved French press filter system 200B components could be retrofitted to any traditional French press coffee maker along with other pieces of the improved French press 200A. One embodiment of the improved French press filter system 200B is comprised of the upper retainer ring 222, the mesh filter 224, the lower retaining ring 226, and the locking ring 208. It is noted that there could be a plurality of upper retainer rings, a plurality of mesh filters, and a plurality of lower retaining rings in the improved French press filter system 200B. The upper retainer ring 222 typically has a spring or other mechanism around the outer edge of the upper retainer ring 222 to assist in pressing the mesh filter 224 to the inner wall of the carafe 202. This pressing of the mesh filter 224 to the inner wall allows there to be some amount of pressure on the mesh filter 224, and the inner wall of the carafe 202, in order to prevent the coffee grounds or other brewing material from slipping around the mesh filter and returning to the filtered liquid. The mesh filter 224 can be comprised of a single or multiple layers of filter material, such as wire mesh or replaceable organic material to provide the majority of the filtering, though other components can aid even if not designed to aid in the filtering process. The mesh filter 224 is placed between the upper retaining ring 222 and the lower retaining ring 226 to provide it support as it is pushed through the brewing coffee in order to filter the coffee grounds from the liquid brewed coffee. Both the upper retainer ring 222 and the lower retainer ring 226 are an open design (holes or spokes) and not completely solid in order to allow the coffee or other liquid to flow through the mesh filter 224. Neither the upper retaining ring 222 nor the lower retaining ring 226 are designed perform any filtering. Likewise, the locking ring 208 can be an open design (spokes) and not completely solid in order to allow the coffee or other liquid to flow unimpeded so that only the mesh filter 224 performs any filtering. In addition, the locking ring 208 can be connected to or manufactured together with the lower retaining ring 226 to form a replaceable piece for traditional French press filter systems. All of these components are connected to the pressing rod 214 through a form of connection such as a threading, press fit, or manufactured as one piece.

Returning to FIG. 2A, the pressing rod 214 is used to press the filter system 212 and locking ring 208 in tandem through the liquid (not shown) being brewed to remove the brewing materials (not shown) from the liquid. The pressing rod 214 in a preferred embodiment is constructed of metal, but in alternative embodiments, can also be constructed of plastic, glass, or other hard material that is capable of withstanding the hot or cold liquid temperatures and the force required to securely mate the locking ring 208 and the locking base 204. The pressing rod 214 passes through the carafe lid 216 at the carafe lid opening 217. The carafe lid 216 is mated with the carafe 202, through a threaded or press fit connection in preferred embodiments, additionally other methods of securing a liquid within an enclosed volume could also be used. In some embodiments, the carafe 202 or the carafe lid 216 may also have an opening to allow the filtered liquid to be poured from the carafe 202 or the carafe 202 may have a pour spout. The carafe lid 216 can be made of the same material as the carafe 202 or a different material. In order to allow the carafe lid 216 to be removed from the pressing rod 214, there is the securing bulb 218, however in other embodiments the securing bulb 218 may not be removable from the pressing rod 214, as the carafe lid 216 can be removed from the lower end of the pressing rod 214 when the filtering system 212 and the locking ring 208 are removed. The securing bulb 218 is attached to the pressing rod 214 through known methods of attachment such as, but not limited to a threaded or a press fitting manner.

Figure 3A:
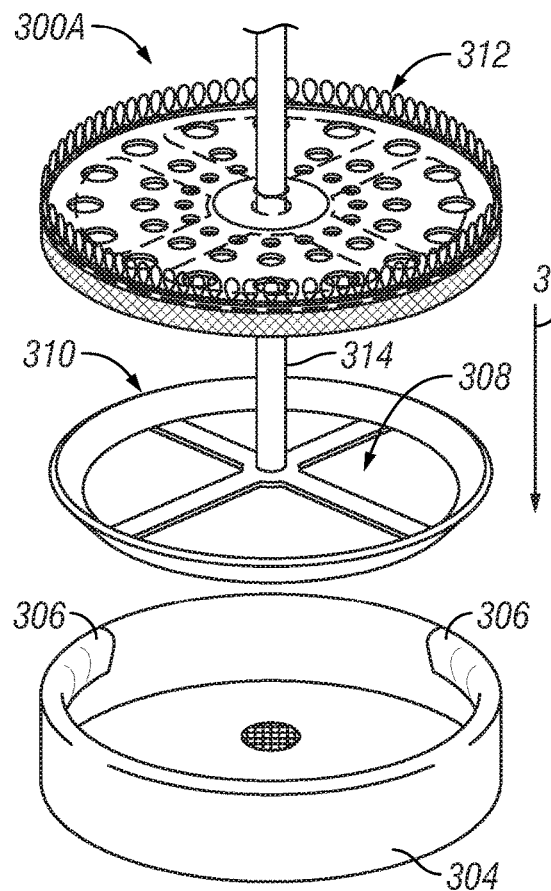
FIG. 3A shows a perspective view of the improved French press filter system in the filtering stage.

FIG. 3A illustrates the filter stage 300A of the improved French press. During the filtering process, the filter system 312 strains and filters the brewed materials, such as coffee grounds or tea leaves, away from the brewed liquid. Some level of downward pressure 330 must be applied to the pressing rod 314 in order to move the combined filter system 312 and locking 308 through the liquid. As the locking ring 308 gets closer to the locking base 304, the locking ring lip(s) 310 begins to mate with the locking base lip(s) 306.

Figure 3B:
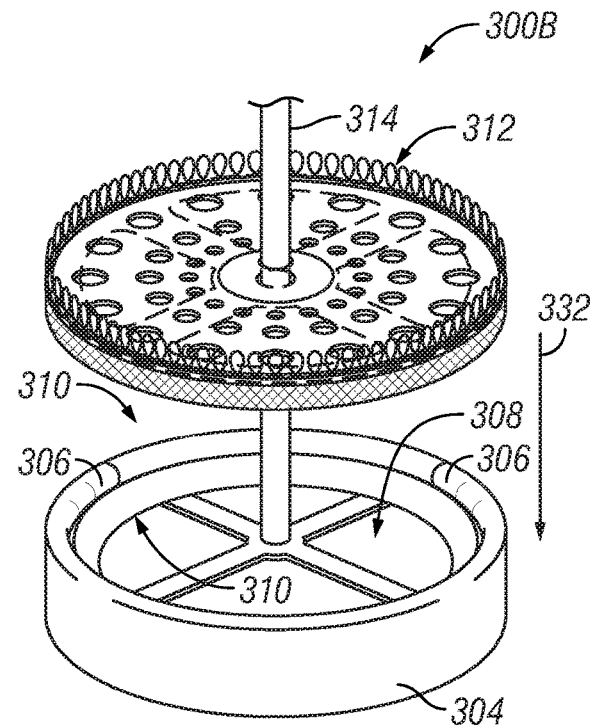
FIG. 3B shows a perspective view of the improved French press filter system in the compression stage.

In FIG. 3B the compressing stage 300B of the improved French press is shown. At the end of the filtering stage 300A, the locking ring lip(s) 310 and the locking base lip(s) 306 are touching along the desired mating points. In order to move the locking ring 308 through the compression stage 300B there must be a specific amount of downward pressure 332 placed on the pressing rod 314 in an amount to compress the locking base lip(s) 306 enough to allow the locking ring 308 and locking ring lip(s) 310 to pass into the void of the locking base 304. Once enough downward pressure 332 is used to move the locking ring lip(s) 310 past the compressed locking base lip(s) 306 then the locking base lip(s) 306 will decompress, thus allowing the decompressed locking ring lip(s) 310 to be secured against the locking base lip(s) 306 during the removal stage.

Figure 3C:
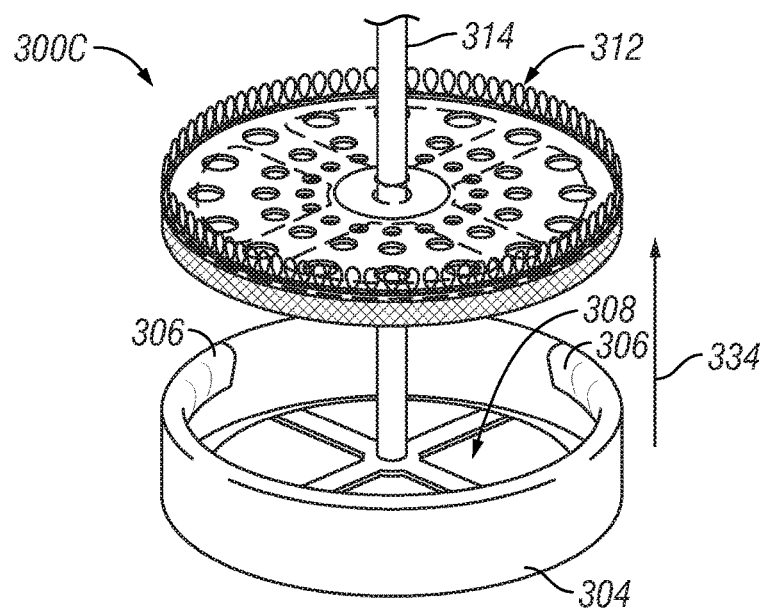
FIG. 3C shows a perspective view of the improved French press filter system in the removal stage.

FIG. 3C illustrates the removal stage 300C of the improved French press. When the locking ring lip(s) (not shown) are within the void of the locking base 304, and both the locking ring lip(s) (not shown) and the locking base lip(s) 306 have decompressed then the removal stage 300C can begin. The locking ring lip(s) (not shown) can be used to pull, when an upward force 334 is applied via the pressing rod 314, on the underside of the locking base lip(s) 306 in order to remove the locking base 304 from the carafe (not shown). In a preferred embodiment, the locking ring 308 will rest within the locking base 304, and the filter system 312 will be resting on top of the locking base lip(s) 306, thus providing a way for the majority of the filtered brewing material to be channeled into the locking base 304.

Figure 4A:
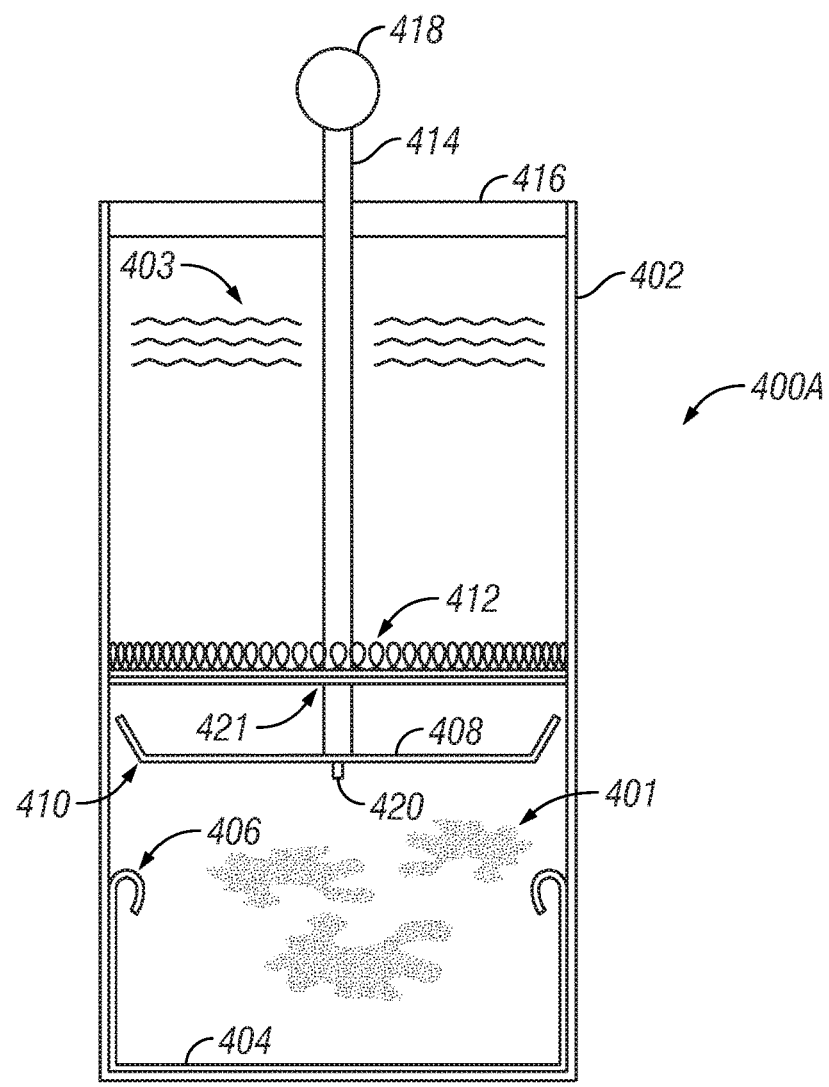
FIG. 4A shows a side view of the improved French press coffee maker in use in the filtering stage.

In FIG. 4A the improved coffee press 400A is being used to remove brewing materials 401 from the brewed liquid 403, in a filter stage similar to that of FIG. 3A. As pressure is applied to the securing bulb 418, and the pressing rod 414, which slides through the opening in the carafe lid 416, the filter system 412 and locking ring 408 are moved through the brewed liquid 403. The filtering system 412 in some embodiments may be attached to the pressing rod 414 at a first connection point 421, and the locking ring 408 is attached at a second connection point 420. The connection points 420, 421 may be a press fit, or threaded connection point, or alternatively could also be of a single piece manufacturing design. As the brewed liquid 403 is separated from the brewing material 401, the brewing material 401 is driven towards the locking base 404 by the filter system 412. In addition, in some embodiments the locking ring 408 provides some assistance in the driving of the brewed materials towards the locking base 404 without providing filtering, though alternatively it may also be combined with the filtering system 412 to provide filtering as well.

Figure 4B:
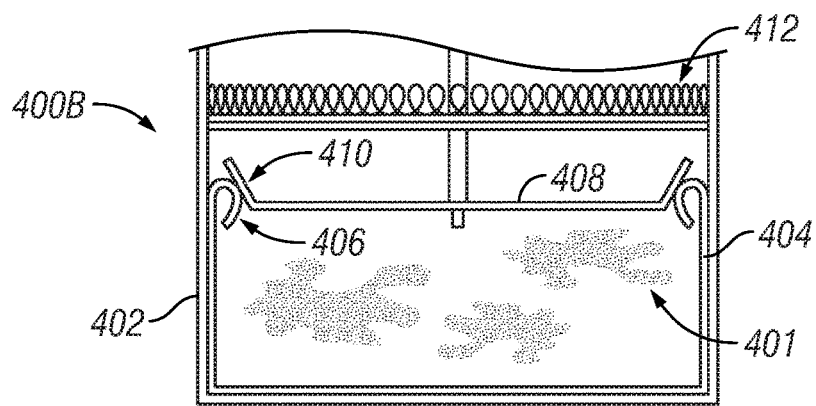
FIG. 4B illustrates the beginning of the compression stage of the improved French press coffee maker.

In FIG. 4B, the compression stage of the locking ring 408 and locking base 404 of the improved coffee press 400B is shown. As the locking ring 408 approaches the locking base 404, the locking ring lip(s) 410 and the locking base lip(s) 406 compress against each other. With sufficient pressure applied to the pressing rod 414 and securing bulb 418, the locking ring lip(s) 410 will be compressed inward towards the pressing rod 414, and the locking base lip(s) 406 will be compressed outward towards the wall(s) of the carafe 402. As the locking ring 408 is pushed through the compressed stage it leads to the secured stage shown in FIG. 5A.

Figure 5A:
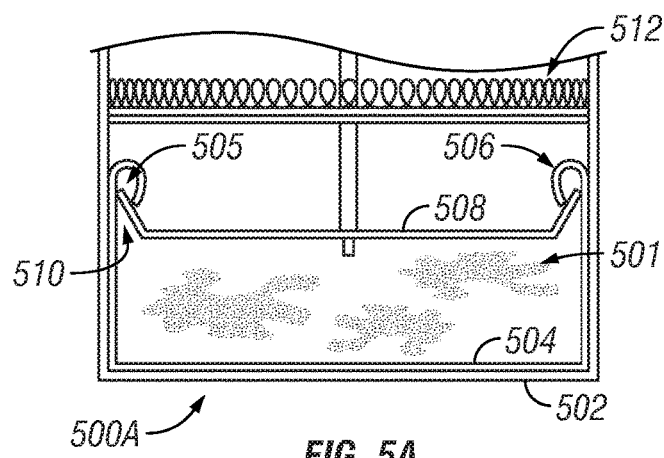
FIG. 5A illustrates the securing stage of the improved French press coffee maker.
Figure 5B:
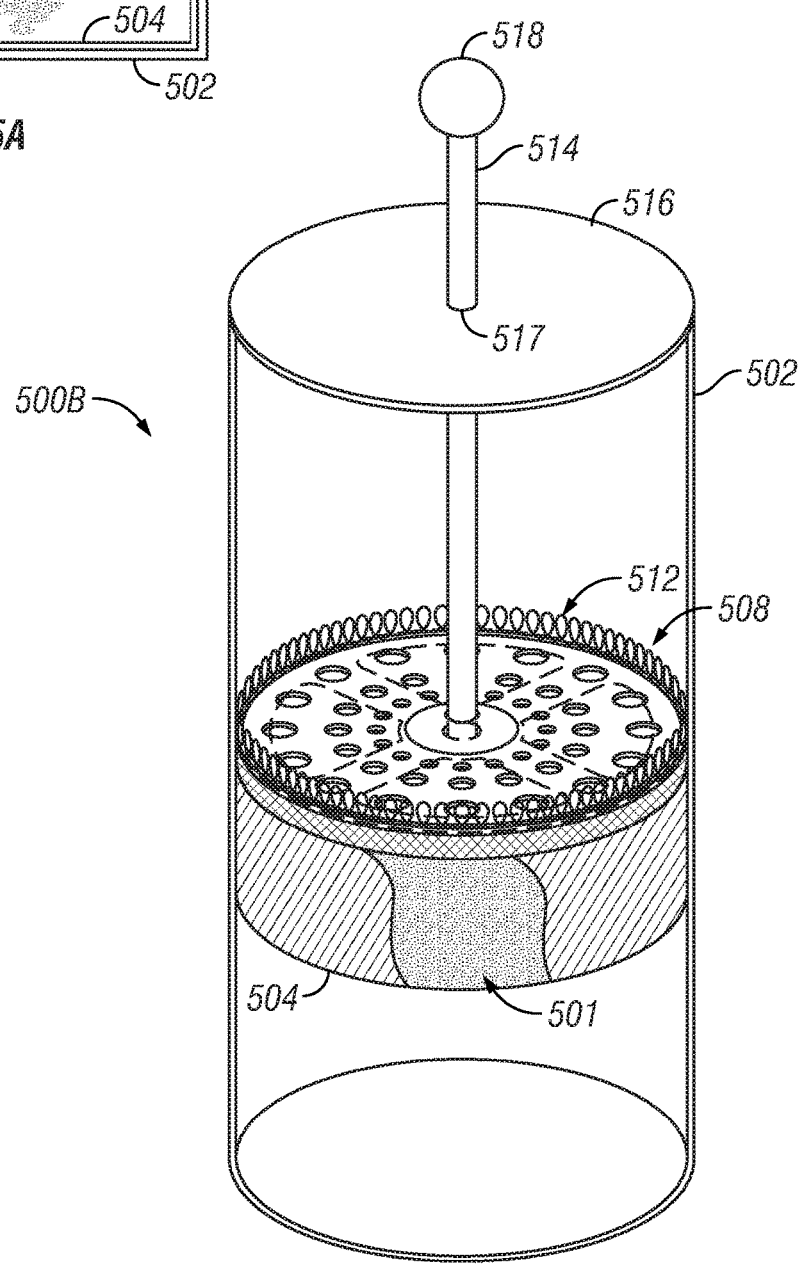
FIG. 5B shows a perspective view of the locking base being removed from the carafe of the improved French press coffee maker.

As seen in FIGS. 5A & 5B, the secured stage of the improved coffee press 500A will allow the locking base 504 to be removed from the carafe 502. One of the improvements of the improved coffee press 500A is the collection of the brewing materials 501 in the locking base 504, thus making the brewing materials 501 easier to remove from the carafe 502. With the locking ring 508 being pushed via the pressing rod 514 through the compression stage 400B, to the securing stage 500A, the locking ring lip(s) 510 decompress along with decompressing of the locking base lip(s) 506 in order to form a secure connection when a pulling force is applied to the pressing rod 514. When a user pulls on the pressing rod 514, in order to remove the locking base 504, the locking ring lip(s) 510 slips into the opening 505 formed between the curved portion of the locking base lip(s) 506, and the locking base 504. Thus providing leverage for the removal of the locking base 504 from the carafe 502. In a preferred embodiment illustrated, the locking ring lip(s) 510 slips inside the opening 505.

During the removal stage of the improved coffee press 500B, the secured connection formed by the locking base lip(s) 506, and the locking ring lip(s) 510, in the opening 505 assist the user in removing the locking base 504 via the pressing rod 514. In a preferred embodiment, the filtering system 512 rests on top of or just above the locking base lip(s) 506 during the removal stage 500B, thus allowing the uncaptured brewing material 501 to be captured between the filtering system 512 and the locking base 504. The result of the capture of the brewing materials 501, is the clean carafe 502 seen in the lower portion of FIG. 5B.

Figure 6A:
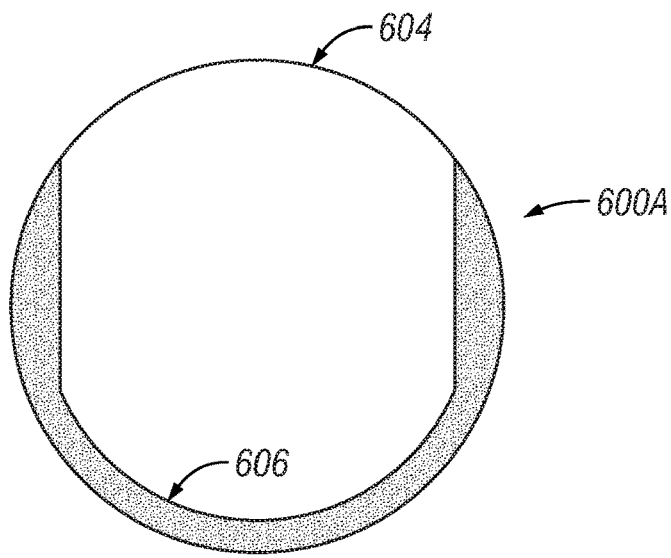
FIG. 6A shows a top view of a first preferred embodiment of the locking base of the improved French press coffee maker.
Figure 6B:
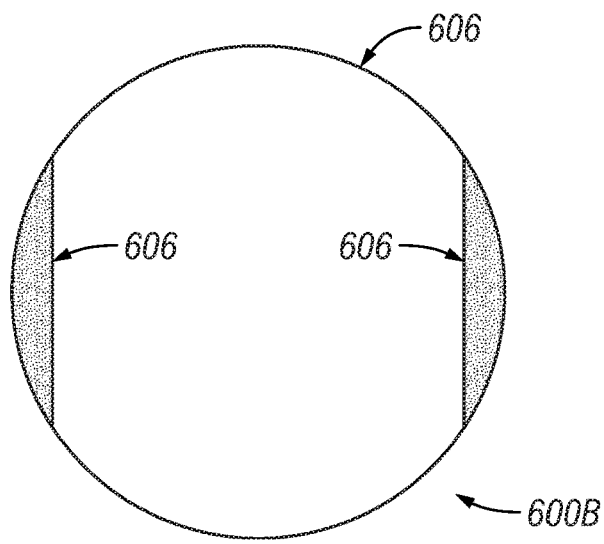
FIG. 6B shows a top view of a second preferred embodiment of the locking base of the improved French press coffee maker.
Figure 6C:
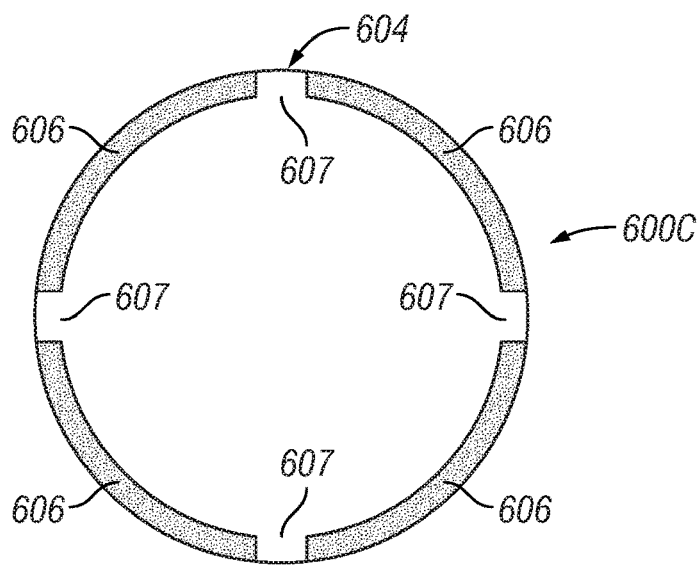
FIG. 6C shows a top view of a third preferred embodiment of the locking base of the improved French press coffee maker.

In FIGS. 6A-6C a top view of locking base 604 and locking base lip(s) 606 in a set of advantageous embodiments is shown. In FIG. 6A, a first preferred embodiment 600A is illustrated that allows the pressing rod (not shown) and the locking ring (not shown) to be shifted to one side to allow the locking ring to be released from the locking base 604 and the locking base lip(s) 606. In a second preferred embodiment 600B, there are two locking base lip(s) 606 shown. In this embodiment the pressing rod (not shown) and the locking ring (not shown) can be shifted to either of the two sides to allow the locking ring to be released from the locking base 604 and the locking base lip(s) 606. In a third preferred embodiment 600C, four locking base lip(s) 606 are shown. In this embodiment, the locking ring (not shown) can be released from the locking base 604 by aligning the locking ring lip(s) (not shown) with the locking base gaps 607. While embodiments have been illustrated that utilize one, two or four lip(s) or wings, other embodiments that include at least one lip(s) or wings are also possible. It could also be understood by someone skilled in the art how the locking base 604 and locking ring (not shown) connection could be achieved through additional means, such as, a threaded configuration, a press fit configuration, a snapping configuration, or other manners known for making a secure physical connection.

Figure 7A:
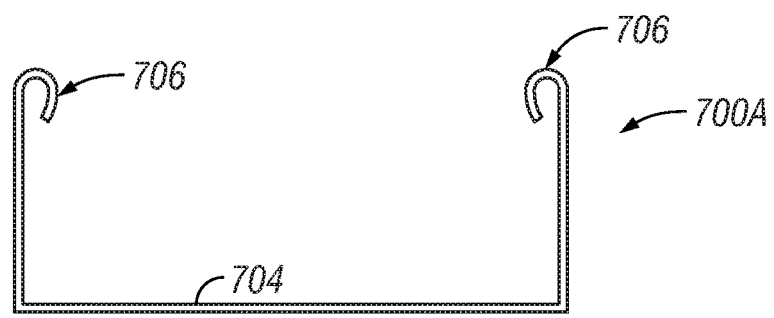
FIG. 7A illustrates a side view of a first preferred embodiment of the locking base, and the locking base lip(s).
Figure 7B:
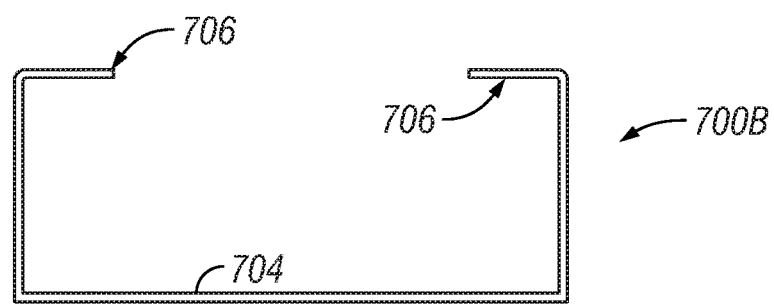
FIG. 7B illustrates a side view of a second preferred embodiment of the locking base, and the locking base lip(s).

A side view of the locking base 704 and locking base lip(s) 706 are seen in FIGS. 7A & 7B. The locking base 704 is configured to capture brewing material (not shown), such as, coffee grounds, tealeaves, pulp from fruits, or other brewable elements. In a first preferred embodiment 700A, the locking base lip(s) 706 curve downward from the upward wall of the locking base 704. The curve of the locking base lip(s) 706 allows for the compression that is created when the locking ring (not shown) is pushed through compression stage to the securing stage, resulting in the locking ring being in the void of the locking base 704. In a second preferred embodiment 700B, the locking base lip(s) 706 are at or below a ninety-degree angle from the wall of the locking base 704.

Figure 8A:
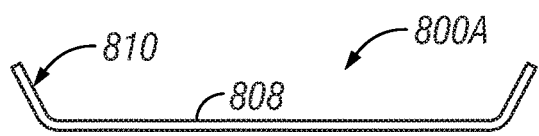
FIG. 8A illustrates a side view of a first preferred embodiment of the locking ring, and the locking ring lip(s).
Figure 8B:
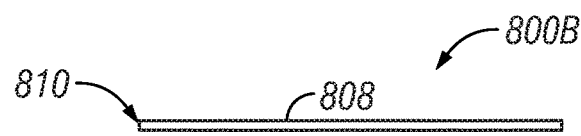
FIG. 8B illustrates a side view of a second preferred embodiment of the locking ring, and the locking ring lip(s).

In FIGS. 8A & 8B, two side views of the locking ring 808 are illustrated. A first preferred embodiment 800A, includes locking ring lip(s) 810 that are upturned from the plane of the locking ring 808. In order to assist in the capture of brewing materials (not shown) the upturned locking ring lip(s) 810 aid in the compression of the locking base lip(s) (not shown) as the locking ring 808 is moved from the compression stage to the securing stage. In a second preferred embodiment 800B, the locking ring 808 and the locking ring lip(s) 810 are in the same plane. This advantageous embodiment works best with the locking base (not shown) with straight or slightly angled locking ring lip(s) (not shown), however it can also be used with the curved locking base lip(s) embodiment as well.

Figure 9A:
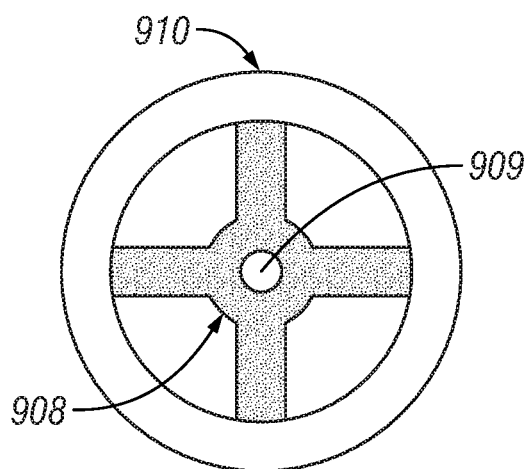
FIG. 9A shows the top view of a first preferred embodiment of the locking ring, and the locking ring lip(s).
Figure 9B:
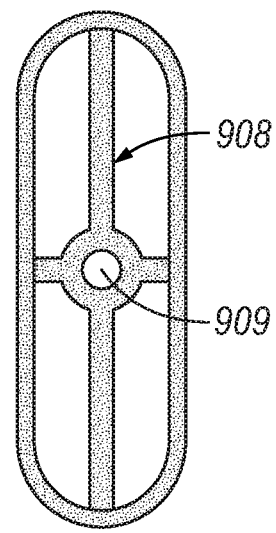
FIG. 9B shows the top view of a second preferred embodiment of the locking ring, and the locking ring lip(s).
Figure 9C:
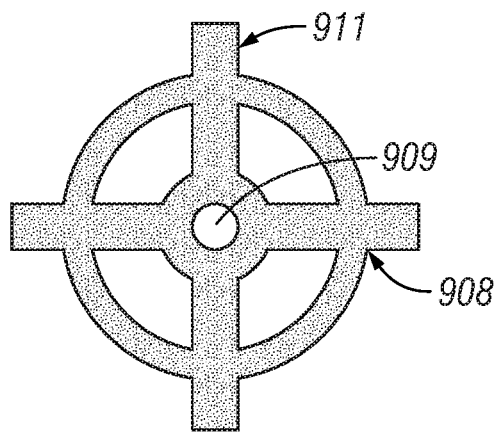
FIG. 9C shows the top view of a third preferred embodiment of the locking ring, and the locking ring lip(s).

A top view of the locking ring 908 is shown in FIGS. 9A-9C. In a first preferred embodiment 900A, the locking ring 908 is configured to closely match with the inner dimensions of the carafe 902, though along two opposing edges there is a gap 911 between the edge or the locking ring 908 and the carafe 902 to allow for the locking ring lip(s) 910 to compress and become secure against the locking base lip(s) (not shown). In a second preferred embodiment 900B, there are large gaps 911 between the carafe 902 and the locking ring 908, on opposing sides. This second preferred embodiment 902 also is configured to work with the first and second preferred embodiments of the locking base (not shown). However, it would be understood by someone with skill in the art that multiple embodiments and configurations are possible. In a third preferred embodiment 900C, the locking ring 908 is shown with four wings that form the locking ring lip(s) 910. The wings extend outward from the pressing rod connection 909. While illustrated in this advantageous embodiment with four wings, the improved coffee press is not limited to four wings, there is to be at least one wing and up to as many necessary to provide support in removing the locking base (not shown).

Figure 10:
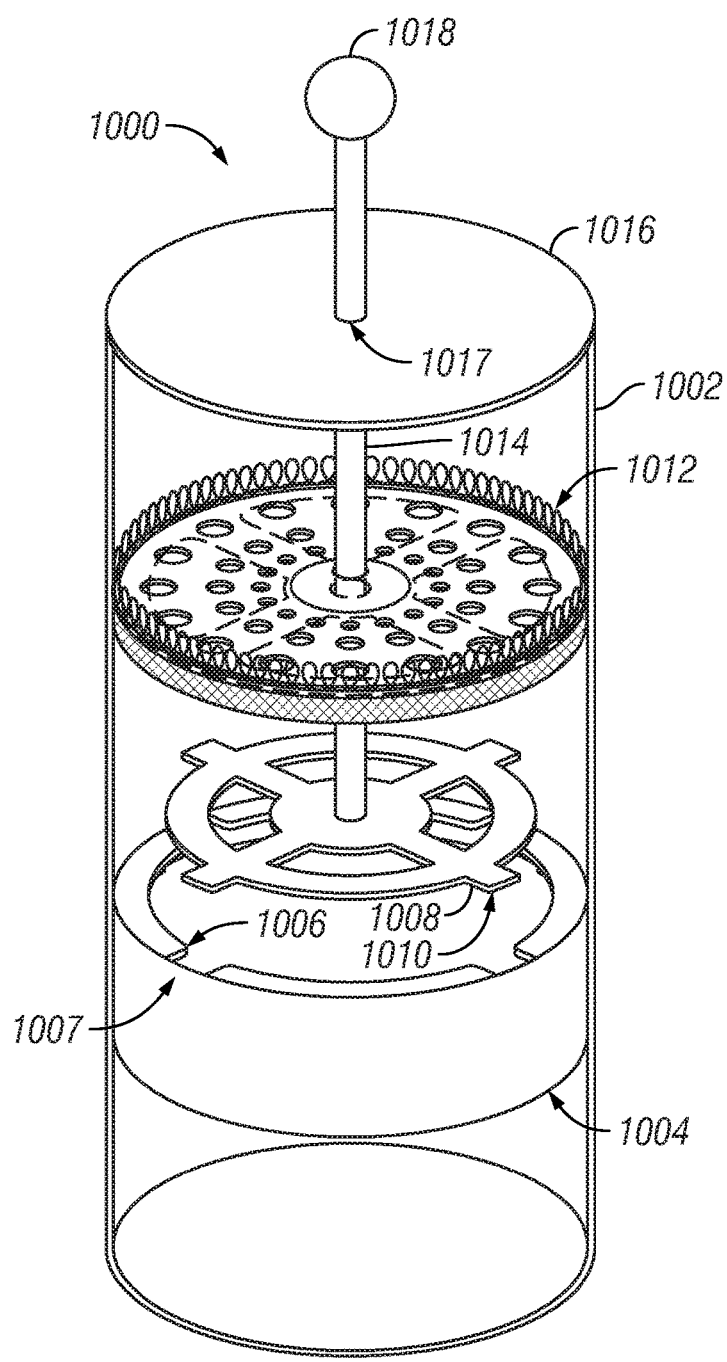
FIG. 10 illustrates a perspective view of a first alternative embodiment of the improved French press coffee maker.

In FIG. 10, an alternative advantageous embodiment of the improved coffee press 1000 is shown. In this alternative embodiment 1000, the locking ring 1008 is comprised of four wings that form the locking ring lip(s) 1010. In addition, the locking base 1004 is comprised of four locking base lip(s) 1006 that are turned slightly downward, and four locking base lip(s) gaps 1007. To start the brewing process the carafe 1002 is filled with brewing material (not shown) and liquid. Once the liquid has been poured into the carafe 1002 the brewing process begins for the proper amount of time. At any time after the brewing process has been started, the pressing rod 1014, locking ring 1008 and filter system 1012 combination is inserted to the carafe 1002 and attached to the carafe 1002 via the carafe lid 1016. As a pressure is applied to the pressing rod 1014, the filter system 1012 and the locking ring 1008 move in tandem further downward into the carafe 1002, removing the brewing material (not shown) from the liquid (not shown). Once the locking ring 1008 has made contact with the locking base 1004, the locking base lip(s) 1006 and the locking ring lip(s) 1010 are touching. The next step is for the user to increase pressure in order to cause the compression necessary to allow the locking ring 1008 and locking ring lip(s) 1010 to move through the locking base lip(s) 1006. In addition, a user may also rotate the pressing rod 1014 in order to rotate the locking ring 1008 so that it aligns with the locking base lip(s) gaps 1007 of the locking base 1004. Once the locking ring 1008 and locking ring lip(s) 1010 have moved past the locking base lip(s) 1006, and the brewing materials are captured in the locking base 1004, the locking base 1004 and the locking ring 1008 can be secured together.

Figure 11:
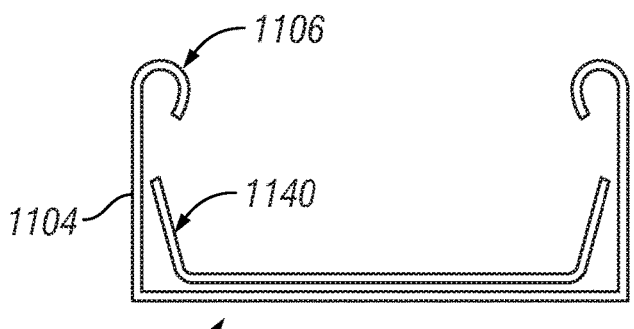
FIG. 11 shows a side view of the locking base with removable grounds container.

In FIG. 11, a side view of the locking base 1104 is shown with a supplemental base 1140 is shown that can be both removable and/or disposable. The supplemental base 1140 is designed to give the user a way to decrease the amount of cleaning that would be required for the locking base 1104. As coffee grounds collect in the supplemental base 1140, the grounds then do not collect in the locking base, thus allowing the locking base 1104 to be used multiple times without cleaning if so desired. This supplemental base 1140 can be made of paper, metal, plastic, or other organic or synthetic materials.

Figure 12A:
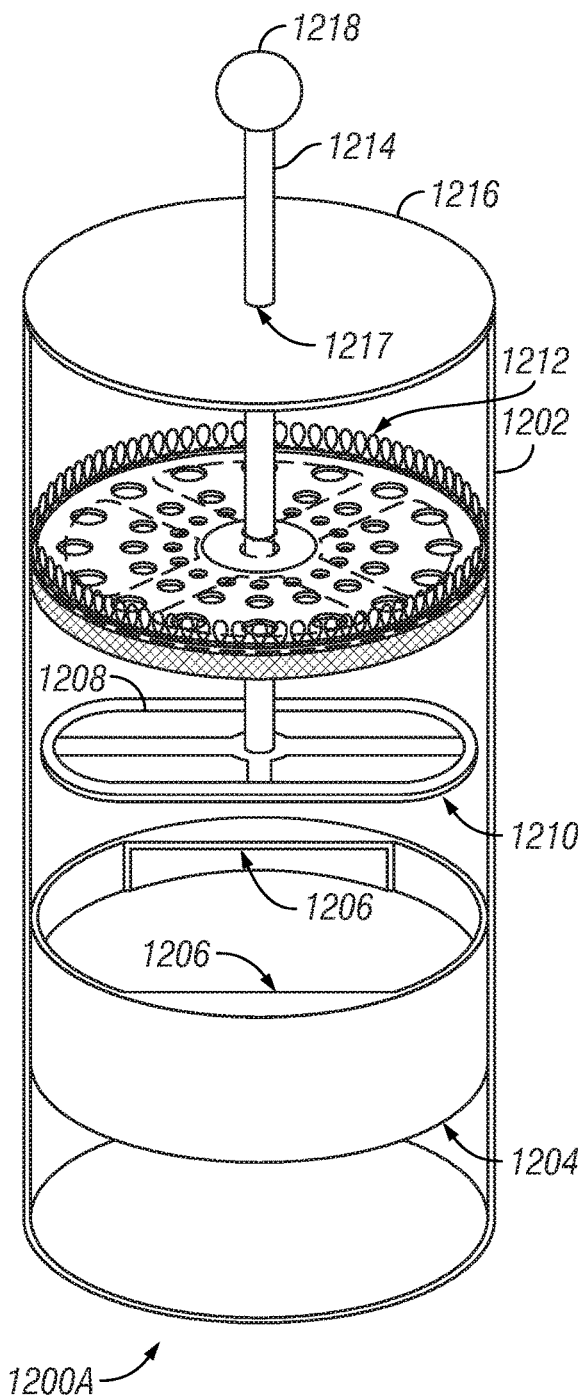
FIG. 12A shows a perspective view of an alternative embodiment of the locking ring lip(s) and the locking base lip(s) in the filtering stage.
Figure 12B:
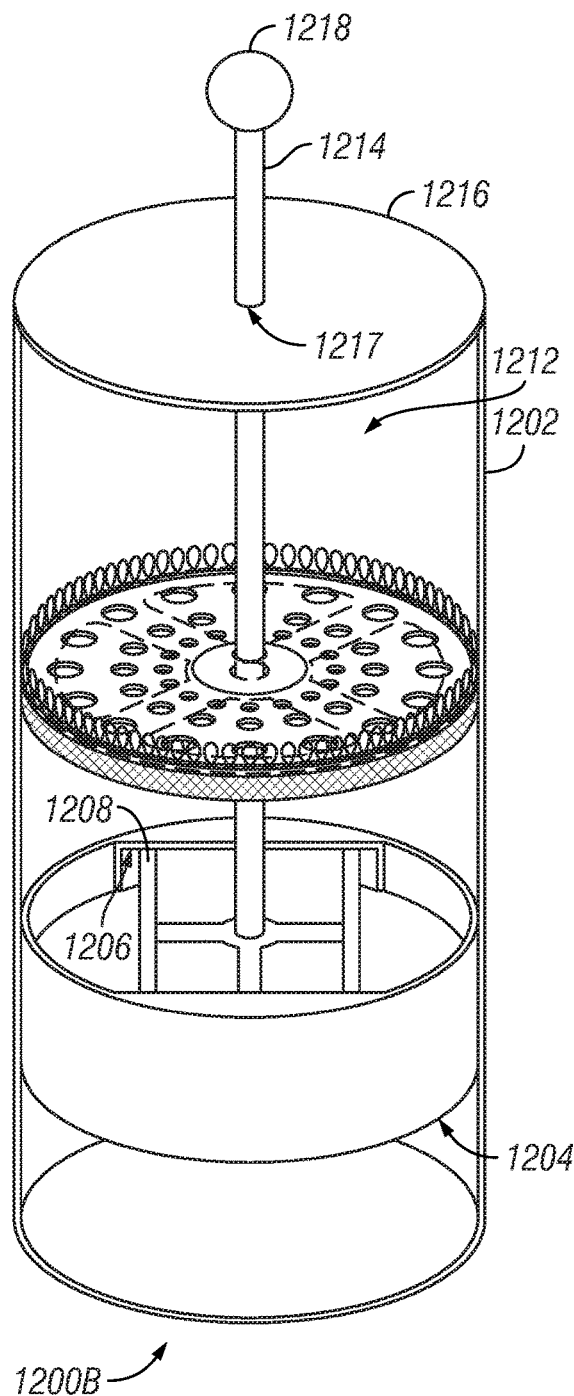
FIG. 12B illustrates a perspective view of an alternative embodiment of the locking ring lip(s) and the locking base lip(s) in the removal stage.

In FIGS. 12A and 12B, an alternative advantageous embodiment of the improved coffee press 1200A and 1200B is shown in different stages. The locking base lip(s) 1206 in these embodiment are the straight or slightly downturned version, in order to assist the removal of the locking base 1204. In addition, the locking ring 1208 is an oblong oval shape, and a straight plane that is configured to move through, the opening created by the locking base lip(s) 1206 when the locking ring 1208 is rotated so that it will move between the locking base lip(s) 1206 with ease. The combination of the dual locking base lip(s) 1206, and the oblong locking ring 1208 allow the user to remove the locking base 1204, by inserting the locking ring 1208 into the locking base 1204 through the gap between the locking base lip(s) or compression and rotating until the locking ring lip(s) 1210 are below the locking base lip(s) 1206 as shown in FIG. 12B. The filtering system 1212 is set some distance above the locking ring 1208, on the pressing rod 1214 in order to remove the remaining brewing materials (not shown) from the liquid during the removal stage. In a preferred embodiment, the filtering system 1212 rests on top of or just above the locking base lip(s) 1206 during the removal stage, thus allowing the brewing material (not shown) to be captured between the filtering system 1212 and the locking base 1204.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A French press apparatus comprising:
   a carafe;
   a pressing rod configured to attach to a locking ring;
   a filter system, the filter system attached to the pressing rod above the locking ring by a specified distance;
   a locking base, the locking base sized to fit inside the carafe with minimal gaps between the locking base and the carafe;

wherein the locking ring is configured to be received within the locking base; and wherein the pressing rod advances the filter system downward into the carafe and allowing the filter system to come in contact with the locking base keeping brewing materials below the filter system and within the locking base.

2. The French press apparatus of claim 1, wherein the locking base further comprises at least one locking base lip that is curved.

3. The French press apparatus of claim 1, wherein the locking base further comprises at least one locking base lip that is straight.

4. The French press apparatus of claim 1, wherein the locking ring further comprises at least one locking ring lip(s).

5. The French press apparatus of claim 1, wherein the locking ring is comprised of at least one wing, said wing having a locking lip(s) distal from a center of the locking ring.

6. The French press apparatus of claim 1, wherein the pressing rod further comprises a first connecting portion at one end.

7. The French press apparatus of claim 1, wherein the locking base further comprises:

a supplemental base, wherein the supplemental base fits within the locking base.

8. The French press apparatus of claim 1, wherein the pressing rod further comprises:

a first connecting portion with one end opposing a securing bulb; and a second connecting portion with one end distal from the first connecting portion, and an opposing end coupled to the first connecting portion.

9. The French press apparatus of claim 1, wherein the filter system further comprises:

an upper retaining ring;

a filter; and a lower retaining ring.

10. The French press apparatus of claim 9, wherein during advancement of the pressing rod the lower retaining ring and the locking ring approach the locking base, and wherein the locking base has a fine mesh comprising a portion of the locking base.

11. The French press apparatus of claim 1 further comprising a carafe lid, the carafe lid attaches to the carafe and has an opening for the pressing rod to slide through.

12. A French press filter system comprising:

a lower retaining ring, the lower retaining ring is configured to attach to a pressing rod and support a filter mesh;

an upper retaining ring configured to be attached to the pressing rod above the filter mesh;

a locking ring, the locking ring attaches to the lower retaining ring via a connection rod; and a locking base, wherein the locking ring and the locking base mate together.

13. The French press filter system of claim 12, wherein the locking base further comprises:

a supplemental base, wherein the supplemental base fits within the locking base.

14. The French press filter system of claim 12, wherein the filter system further comprises the pressing rod that removably attaches to the lower retaining ring.

* * * * *